Figure 1:
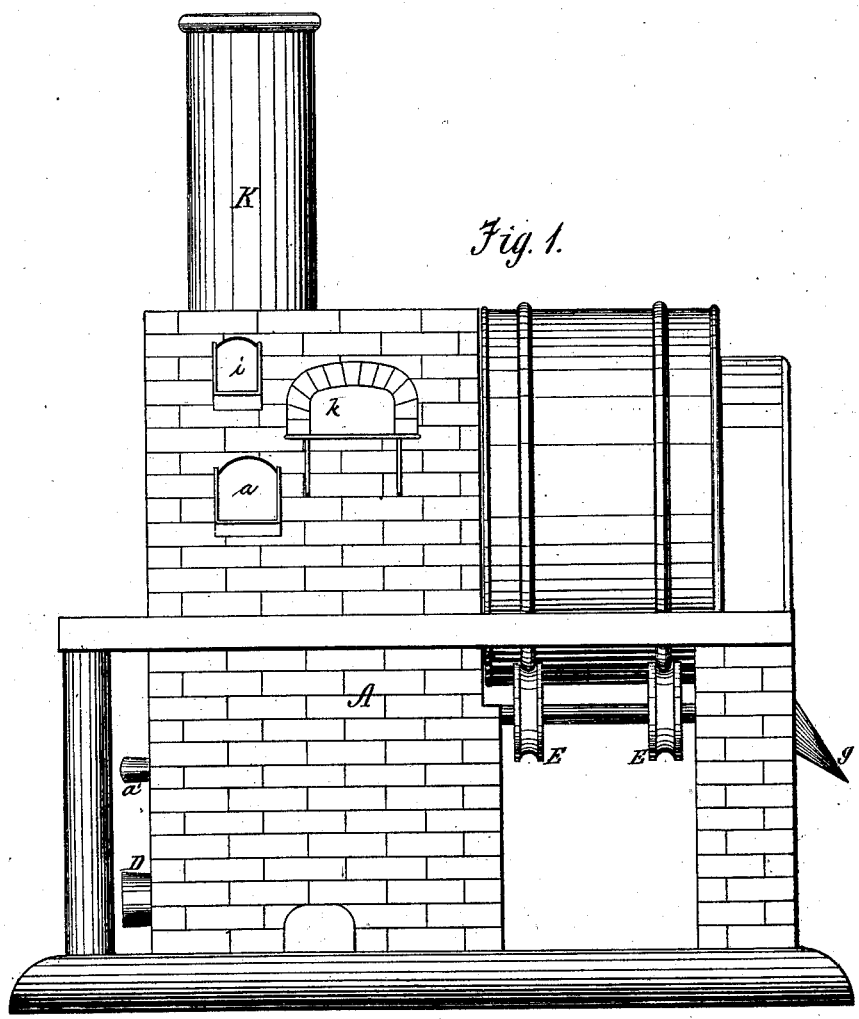

2 Sheets--Sheet 1.

G. J. & S. J. SHIMER.
Process and Furnace for Manufacturing Iron.

No. 165,375. Patented July 6, 1875.

WITNESSES:
W. W. Hollingsworth
John C. Kenon

INVENTOR:
Geo. J. Shimer
Saml. J. Shimer
BY
ATTORNEYS.

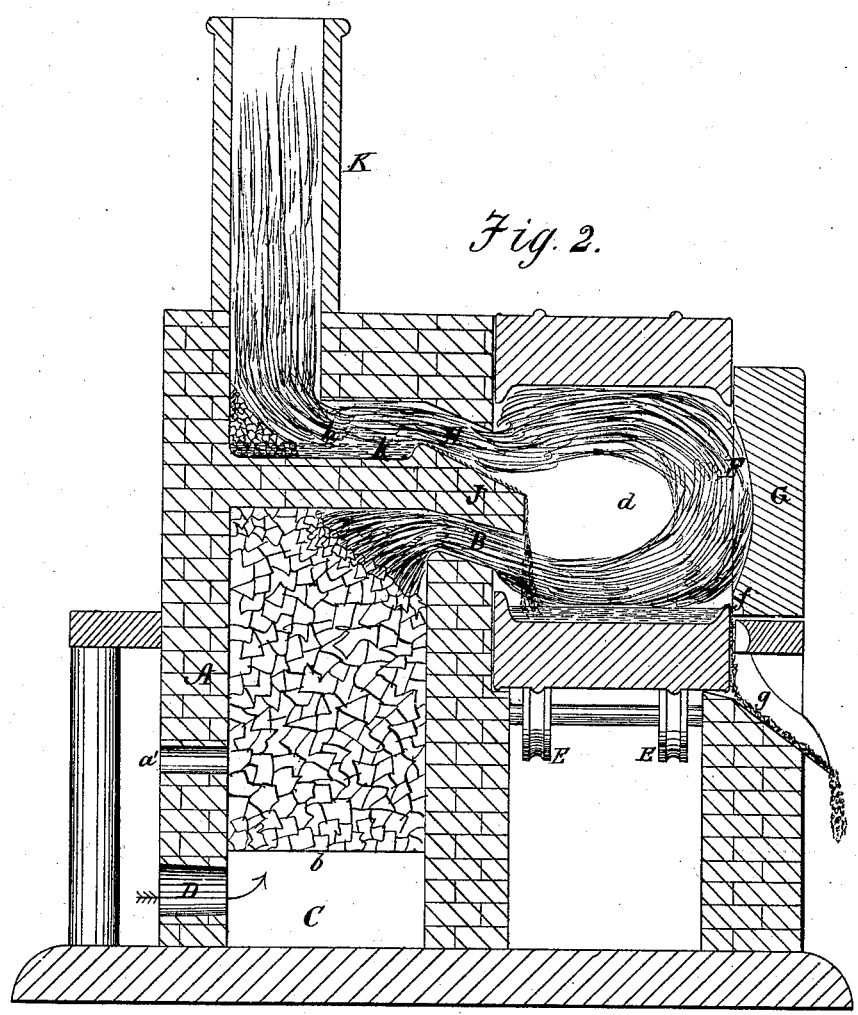

UNITED STATES PATENT OFFICE.

GEORGE J. SHIMER AND SAMUEL J. SHIMER, OF MILTON, PENNSYLVANIA.

IMPROVEMENT IN PROCESSES AND FURNACES FOR MANUFACTURING IRON.

Specification forming part of Letters Patent No. 165,375, dated July 6, 1875; application filed March 10, 1875.

*To all whom it may concern:*

Be it known that we, GEORGE J. SHIMER and SAMUEL J. SHIMER, of Milton, in the county of Northumberland and State of Pennsylvania, have invented a new and Improved Metallurgic Furnace; and we do hereby declare that the following is a full, clear, and exact description of the same, reference being had to the accompanying drawing forming a part of this specification, in which—

Figure 1 is a side elevation, and Fig. 2 a longitudinal vertical section.

There are only two substances known to us that will deoxidize the oxide of iron—viz., carbon and hydrogen, in a highly-heated condition. Carbon has been the agent used in practice almost exclusively, as it was the most readily obtained, and less chemical skill was required for its application; but the objection to its use for the manufacture of wrought or refined iron is that it combines with the iron, forming a carburet, which, in turn, must be reduced to form the refined metal, thus necessitating a second operation, and a consequent expense, besides deteriorating the original good qualities of the iron in ore, as every reheating, where the iron comes in close contact with the fuel, results in the absorption of more of those impurities so hard to get rid of, and, in many cases, very detrimental, such as sulphur, phosphorus, silica, manganese, magnesia, &c.

We have in hydrogen a reducing agent that will give us the desired result, by reducing the ore without combining with the metal.

In the English patent of Gurlt, No. 1,679, of 1856, a process of reducing iron ore by means of hydrogen gas is described. But, previous to the action of the gas upon the ore, a portion of atmospheric air was allowed to combine with it, thus reducing the deoxidizing power of the hydrogen gases, and proportionally lessening their effectiveness, without a corresponding economic gain or advantage in the degree of heat. The reduction was carried on at a temperature below the melting-point of the ore; consequently a second operation was necessary for the purpose of ridding the metal of foreign substances.

In our invention melted ore is acted on by a blast of highly-heated hydrogen gas, and the same blast, combined with atmospheric air, is caused to melt the ore preparatory to such action. The blast is produced from bituminous coal, and the whole operation is carried on at a temperature above the welding-heat of iron.

Our invention also relates to a certain construction of furnace for economic application of our process, all as hereinafter described.

A represents heating-furnace, being a chamber lined with refractory material, and arched over. Immediately below the arch are openings or inclined chutes $a$, for the supply of coal, and at the sides are openings $a'$, for the purpose of poking the fire. On the one side is a lengthy opening, B, for the escape of blast the grate $b$ forming the bottom to chamber A, and below this is ash-pit C, which will, in practice, be provided with a suitable opening through which the fire may be raked and the ashes removed. The blast-pipe D is in one of the walls below the grate, and against the side with the opening B for the heated blast, is arranged a rotary chamber, $d$, constructed of iron, cylindrical in form, with openings at each end, and lined with refractory substances. The latter are so arranged as to hold a certain amount of molten material, being deeper immediately inside the openings, and mounted upon grooved wheels E E E E, that, by the tracks, guide the cylinder in its rotary motion. This motion is communicated by means of the grooved wheels E E E E, the same being fastened to shafts connected with the motive power. The cylinder $d$ being on a level with inside lining, the opening F is the largest, so that the waste flux will escape by means of drip $f$ on door G, and down drip $g$. The door G is used for the removal of the iron, and closed when furnace is operated. The blast enters from heating-furnace A, through opening B below the axial line of rotary chamber $d$, and passes along lower part of same, recoils, and passes back along the upper part and out through opening H. The latter is inclined upward leading into chamber $h$. The opening B, where blast enters, and the opening H, where the same escapes the rotary chamber $d$, are within a space equal to the circular opening of the smaller end of chamber $d$, and the wall of the heating-furnace at that place is so arranged that a brick of plumbago, J, or other refractory substance, may easily be inserted between the openings. The brick J is so constructed and inserted as to overhang the end of rotary chamber d, forming a drip to chamber h, and also give a downward current to the blast entering rotary chamber at B. The chamber h is built by continuing the walls of the heating-furnace above its arch, and arching same over at the upper end of chamber h, where are feeders or chutes i, Fig. 1, for the supply of ore. These feeders are to be kept full, and can be increased in number.

The chamber h is extended to utilize (for melting) all the heat prior to its passage up the stack K. At k, in chamber h, is an opening provided with a door, (not shown,) for the purpose of treating the molten oxide of iron with limestone or other neutralizing substance, should the same be necessary. The bottom of chamber h is made several inches lower than the inclined opening H, by which the blast enters, and the molten oxide of iron contained in chamber h is thus at all times several inches deep.

The various qualities of ore exposed to blast may thus the more readily be mixed together to produce an iron with different qualities. The operator can also at will give draft of air to blast at opening k, which, combining with the superabundance of hydrogen yet unconsumed, increases the heat of the blast for the purpose of smelting the ore more rapidly, if required, or burning off sulphur.

This apparatus being for the purpose, first, to generate a deoxidized blast, and, next, to expose to its action the greatest amount of oxide of iron, need not necessarily be built as represented; but may be in any form wherewith the operator can expose to the action of a deoxidized blast the greater amount of molten oxide of iron.

Having described the apparatus, its action is, first, to produce a deoxidized blast by means of the heating-furnace A, wherein a fire is kindled and bituminous coal is applied, or part bituminous and part anthracite coal, until the same is filled, including the openings.

When the furnace is operated, the ash-pit opening is closed, as also apertures a', with balls of clay, and are only opened to renew or enliven the fire, as the same becomes compact. The openings a are kept full of coal, and the fire is self-feeding as the consumed coal sinks away. The blast, by means of pipe D, is so regulated in force as to effect the decomposition of all its oxygen in its passage through the whiter or superheated coals, the blast acting upon the continually fresh supply of coal on top of fire, and expelling a portion of its hydrogen gases. Thus we have a highly-heated blast composed of carbonic oxide, carbureted hydrogen, and hydrogen gases, which, passing through the aperture B below the inserted brick J, forces the blast in a downward current, which passes through the drippings of the molten iron ore from chamber h, and over the molten mass of nearly reduced iron, refined iron, and flux contained in rotary chamber d to the back end of same. This blast then recoils and passes along upper lining, and through the inclined opening H, thus presenting to the action of a deoxidized blast the molten oxide of iron as it passes down inclined chamber H.

This molten oxide comes against the current of blast, and, dripping through, it is deprived of its oxygen by the superabundance of hydrogen contained in blast. The oxygen unites with the hydrogen, producing heat, and such particles as may not be reduced sink through the flux to the lining of rotary chamber d, where they are brought up by its rotary motion, and exposed to the action of blast along said lining.

At opening k, in chamber h, a fresh supply of oxygen may be introduced to consume the undecomposed hydrogen yet in blast, and increase the heat, and utilize all the fuel, which cannot be stinted in heating or deoxidizing chamber A.

Should the smelting proceed too rapidly, the opening k is closed, and the deoxidation is commenced and partially effected in chamber h. As the oxide of iron becomes deoxidized in its passage down the inclined chamber H, and its fall through current of blast to lower side of chamber d, it becomes of a different nature, having adhesive qualities, while the concussion of its fall (striking against lower side of the rotary chamber d) expels all the flux and foreign sandy matter. The refined iron forms and adheres to a mass or ball as rapidly and as evenly as the same is produced. Thus, in consequence of the small particles of reduced iron added to the ever-changing surface of the ball or mass, caused by the motion of the rotary chamber, the weight of iron formed acts upon the addition of each layer as the same revolves on bottom of chamber, picking up such particles as may have become reduced from the flux on the sides of chamber. The flux is expelled by the weight of the mass.

There is thus produced a pure mass of iron ready for the rolls upon its removal from the chamber d, to be finished for market without reheating or reworking.

We are aware that in Patent No. 92,894 a blast from which air is excluded has been described. We do not claim, broadly, the action of a blast from which air is excluded, nor the use of the spent gases for roasting or desulphurizing the ore, as our invention herein described is based in part upon melting the ore before deoxidizing it. In our process we prevent carbonization, and obtain an important advantage in rapid and economic production of iron.

Having thus described our invention, what we claim as new is—

1. The process of reducing iron ore to wrought-iron in one operation, consisting, first, in subjecting the ore in a liquid or molten condition to the deoxidizing influence of a blast containing hydrogen or carbureted hydrogen gases, and, secondly, in melting the ore by the subsequent action of the same blast admixed with atmospheric air, as described.

2. In a metallurgic furnace, the combination of the heating-furnace A, the forming-chamber $d$, inclined passage H, and smelting-chamber $h$, the latter having a floor cavity or depression from which the melted ore overflows and passes down the contiguous incline to chamber $d$, being thus subjected to the action of the blast in the desired manner, all as shown and described, to produce the result specified.

GEO. J. SHIMER.
SAMUEL J. SHIMER.

Witnesses:
W. M. APPLEGATE,
JNO. MILLER.